United States Patent [19]
Craig

[11] 3,832,906
[45] Sept. 3, 1974

[54] GIMBAL STRUCTURE FOR DYNAMICALLY TUNED FREE ROTOR GYRO

[75] Inventor: Robert J. G. Craig, Malibu, Calif.

[73] Assignee: Teledyne Industries, Los Angeles, Calif.

[22] Filed: July 30, 1973

[21] Appl. No.: 375,841

[52] U.S. Cl. .................................... 74/5 F
[51] Int. Cl. .......................... G01c 19/18
[58] Field of Search ............. 74/5 R, 5 F, 5.6 R; 308/2 A

[56] References Cited
UNITED STATES PATENTS

| 3,354,726 | 11/1967 | Krupick et al. | 74/5 F |
| 3,543,301 | 11/1970 | Barnett | 74/5 F |
| 3,678,764 | 7/1972 | Erdley et al. | 74/5 F |
| 3,700,290 | 10/1972 | Ensinger | 74/5 F |
| 3,702,568 | 11/1972 | Howe | 74/5 F |

Primary Examiner—Manuel A. Antonakas
Attorney, Agent, or Firm—Marvin H. Kleinberg

[57] ABSTRACT

A dynamically tuned, free rotor gyro is provided with three concentric gimbals. The principal moments of inertia of the gimbals are selected to completely cancel the errors of twice spin frequency rectification effects by merely adjusting the inertias of the gimbals.

7 Claims, 8 Drawing Figures

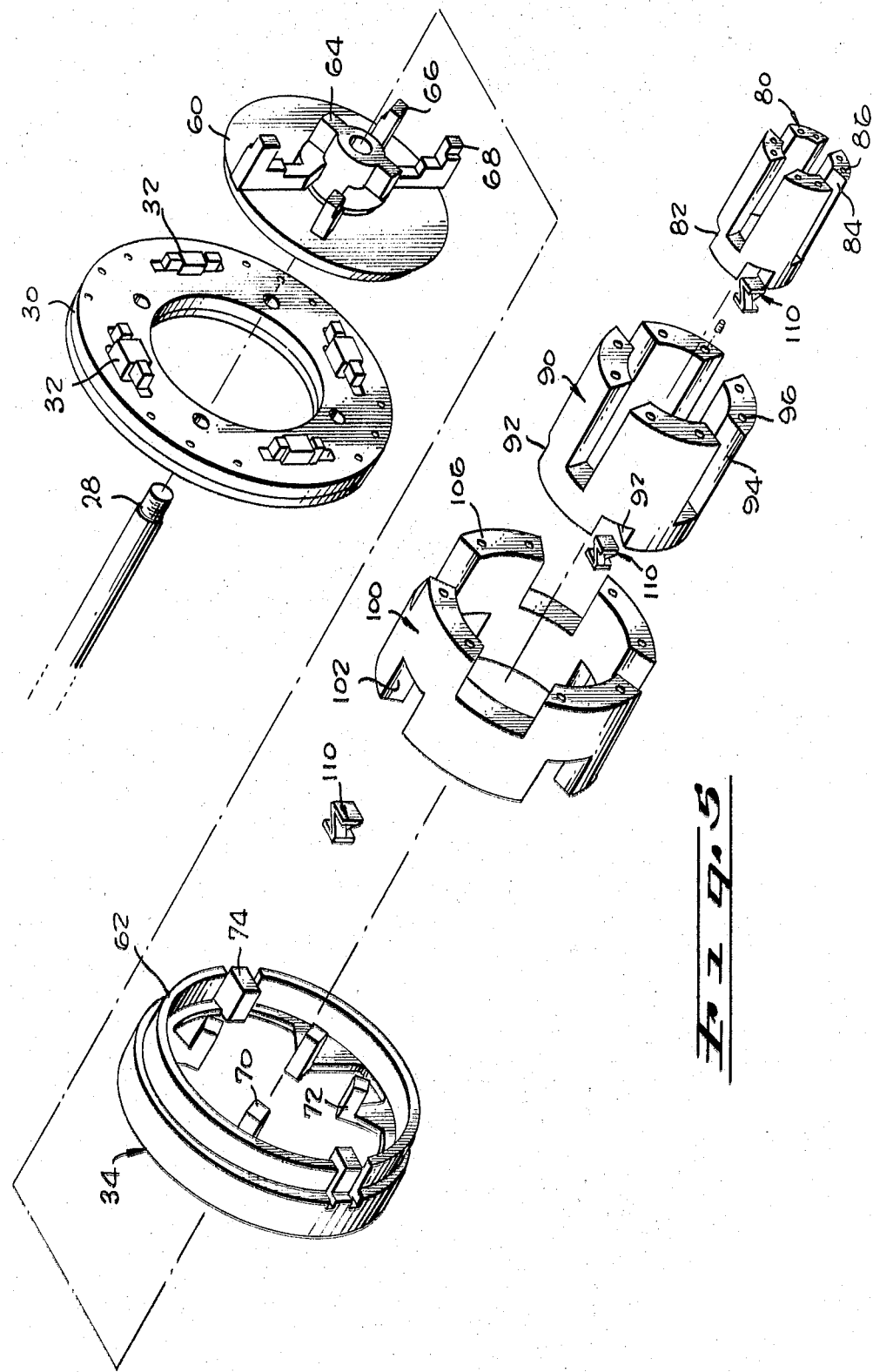

GIMBAL STRUCTURE FOR DYNAMICALLY TUNED FREE ROTOR GYRO

BACKGROUND OF THE INVENTION

1. Field of the Invention

The present invention is related to nonfloated, free gimbal gyros and, more particularly, to a free rotor gyroscope having three or more gimbals to compensate for the twice frequency rectification effects normally encountered in single gimbal devices. Related prior art would be U.S. Pat. No. 3,678,764 to H. F. Erdley, et al.; U.S. Pat. No. 3,354,726 to W. J. Krupick, et al.; and U.S. Pat. No. 3,301,073 to E. W. Howe.

In recent years great interest has been shown in tuned free rotor gyroscopes having vibrating intermediate gimbals. Such devices have substantial advantages of cost and ease of assembly over earlier floated gyroscopes. Dynamically tuned, free rotor gyroscopes have been extensively described in the above-identified patents as well as in an article entitled "Dynamically Tuned Free Rotor Gyroscope" published in CONTROL ENGINEERING of June 1964, at pages 67–72. Further, the general class of "Free Gyroscopes" has been discussed in AIAA Paper No. 65-435 delivered at the AIAA Annual Meeting in San Francisco, Calif., July 26–29, 1965, which paper is entitled "Dynamics of Ideal Suspensions Applied to Rotating Bodies in Space" by Paul H. Savet.

2. Description of the Prior Art

In the past, a dynamically tuned, free rotor gyro, in its simplest form, employed a single gimbal between the rotor and the shaft. This configuration has led to an error resulting from an angular oscillation at twice the frequency of the rotation of the shaft. In an attempt to reduce or eliminate this error, alternative configurations have been provided, such as, a two gimbal suspension in which the axes of the gimbals are orthogonal. This approach is extensively described in the above-identified patent to Erdley, et al., U.S. Pat. No. 3,678,764. In the Erdley, et al. patent, the preferred solution included the two gimbal configuration, although a three gimbal structure was suggested.

A thorough analysis of the problem of the errors resulting from the twice spin frequency rectification has shown that the error contribution of each gimbal can be represented by a vector in space relative to the gyro case. The magnitude of the vector is determined by the principal moments of inertia of the gimbal, and the direction is a function of the orientation of the gimbal.

For example, in the preferred configuration of the Erdley, et al. patent, the vectors corresponding to the twice frequency rectification effect of each gimbal can be resolved into two vectors which are approximately 180° apart. If the axes of the gimbals are exactly at right angles, the vectors would cancel if the principal moments of inertia are equal.

It is well known, as a practical matter, that it is virtually impossible to have any complex structures such as gimbal axes displaced from each other by exactly 90°. Certainly the process of fabrication will result in some small, but not negligible, error whose effect over a very long time cannot be disregarded. Therefore, a resultant vector will invariably be created whose magnitude and direction is substantially irreducible, even after all other adjustments of the mass of the gimbals have been made.

SUMMARY OF THE INVENTION

Although the concept of more than two gimbals is known, three being mentioned in the Erdley, et al. patent, it has been discovered that through the use of three or more gimbals of appropriate design, it is possible to completely cancel the twice frequency effect merely by adjusting the moments of inertia of the gimbals. Adjustments of the magnitude of each of the three vectors can result in perfect cancellation, so long as at least two of the gimbals axes are separated by more than 90°.

In a preferred embodiment of the invention, three concentric gimbal rings are provided. The axes of the three are equiangularly spaced. In such an arrangement, the principal moments of inertia of each of the gimbals may be expressed as:

$$A_i + B_i - C_i \tag{1}$$

where $i$ varies from 1 to 3 and identifies each of the three gimbals, and A, B and C are the components along the X, Y and Z axes, respectively, for spin around the C axis.

In the case of balance, the principal moments of inertia of all of the gimbals should be equal. It is therefore possible to merely adjust the inertias of each gimbal to reduce the resultant vector sums to zero.

A plurality of mounting "posts" are provided which are connected to the shaft. The gimbals are provided with mating apertures into which an appropriate coupling fixture is placed. The coupling fixture, in the preferred embodiment, is a special X-flexure which connects the gimbals and the posts.

The gimbal axes are nominally coplanar. However, if the gimbal axes are not coplanar, an additional, twice frequency rectification error would be introduced. However, this effect is easily eliminated by making the gimbals pendulous, thereby changing the plane of the center of mass of each gimbal so that the centers of mass can be adjusted to be coplanar.

An additional advantage of the three concentric gimbals is that the mass loading can be substantially increased over single or double gimbal configurations.

In alternative embodiments, the mounting posts which are attached to the shaft may be mounted on a base plate which matches a corresponding rotor post assembly to provide a plurality of substantially coplanar posts at different radial distances from the center of the shaft. In other embodiments, a "spider" member is mounted to the shaft and fits between a plurality of post members that extend from the housing of the rotor.

In yet other embodiments, the concentric gimbals may be provided with the mounting "posts," and corresponding mounting pads are located on members which are attached respectively to the rotor and the shaft. In such an arrangement, as well, it is relatively easy to adjust the principal moments of inertia and to adjust the planes in which the centers of mass exist, so as to result in a tuned gyro that substantially lacks twice frequency rectification errors.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 5 is an exploded view of the assembly that mounts concentric with the rotor shaft showing the concentric gimbals and the coupling plates;

DESCRIPTION OF THE PREFERRED EMBODIMENTS

Figure 1:
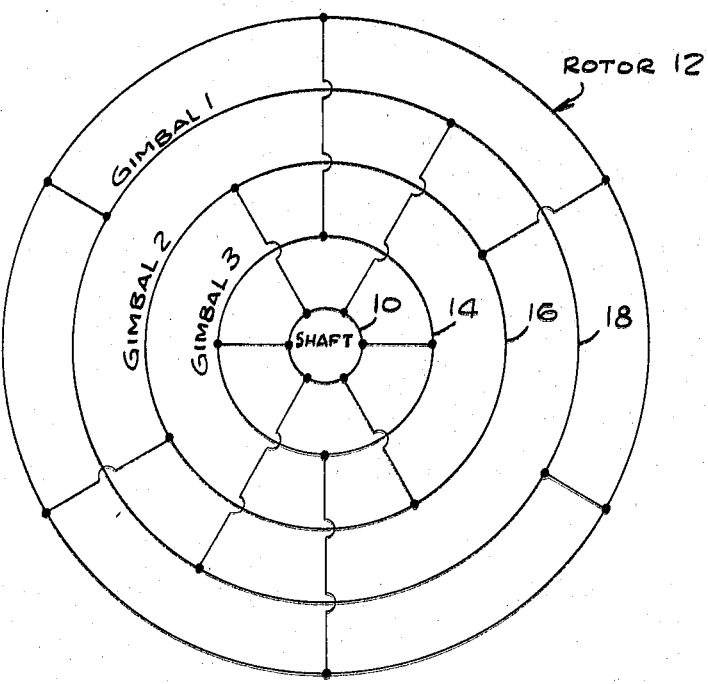
FIG. 1 is an idealized sketch of free gimbal, free rotor gyro showing couplings to the gimbals from the rotor and the shaft.

Turning first to FIG. 1, there is shown, schematically only, an idealized arrangement according to the present invention in which a shaft 10 drives a rotor 12 through a coupling which includes three gimbals. A first, inner gimbal 14 is coupled to the shaft along a first diameter. A second, intermediate gimbal 16 is coupled to the shaft 10 along a second diagonal, which is displaced from the first diagonal by approximately 120°. A third, outer gimbal 18 is connected to the shaft at a third diameter which is displaced approximately 120° from the first and second diameters.

The rotor 12 is coupled to the inner gimbal 14 along a diameter which is at right angles to the coupling of the shaft 10 to the inner gimbal 14. Similarly, the couplings between the rotor 12 and the intermediate gimbal are at right angles to the coupling of the intermediate gimbal 16 and the shaft 10, as is the coupling between the rotor 12 and the outer gimbal 18.

It will be seen that as the assembly rotates through each 60° of rotation, there will be provided a "new" rotational axis in a plane orthogonal to the shaft 10 about which the rotor 12 can "tilt" with respect to the shaft 10. This plurality of axes tends to substantially reduce the magnitude of the "twice spin frequency" rectification errors.

Figure 2:
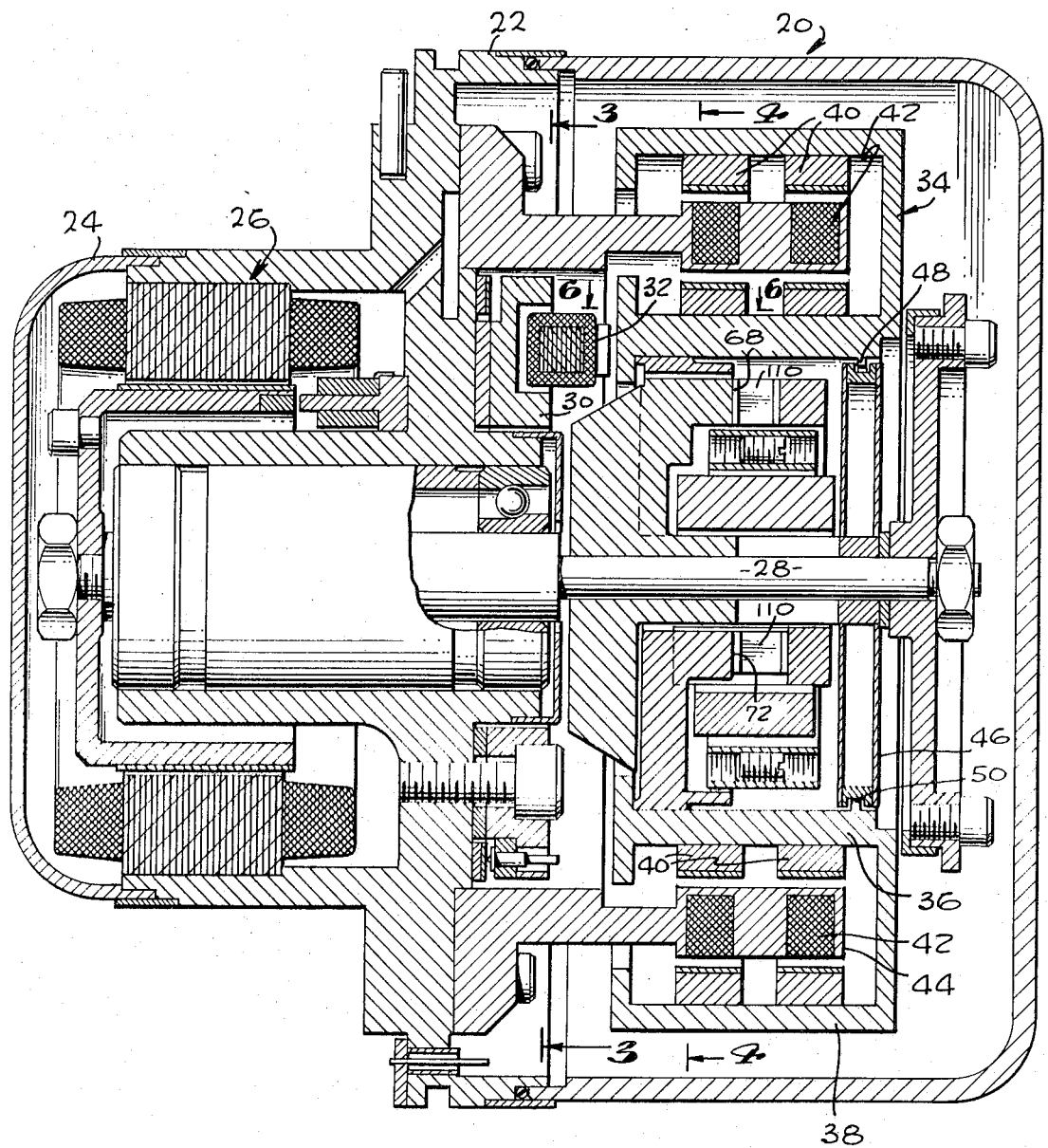
FIG. 2 is a side section view of a free rotor gyroscope according to the present invention.

Turning to FIG. 2, there is shown in side sectional view a free rotor gyro 20 which incorporates a gimbal structure according to the present invention. The gyro 20 includes, among other things, an outer case 22 which encloses the entire mechanism and a housing 24 surrounding the motor 26. The motor 26 powers the rotor shaft 28. A plate 30 incorporates pick-off coils 32, which function in the conventional manner.

A gyro rotor 34 includes concentric outer side walls 36, 38 in which are embedded torquer magnets 40. Torquer coils 42 are incorporated in a cylindrical member 44 that is interposed between the outer rotor side walls 38, 40.

A novel, angular limit-stop assembly includes a first member 46 that is fastened to the rotor shaft 28, which includes a peripheral channel 48, and a second member having a circumferential ridge 50, narrower than the width of the channel 48, on the face of the innermost rotor side wall 36 adjacent the channel 48.

Three concentric gimbal rings, to be described in greater detail below, couple the shaft 28 to the rotor 34 and, through torsional couplings of unique design, enable the rotor 34 to "tilt" relative to the shaft 28.

Figure 3:
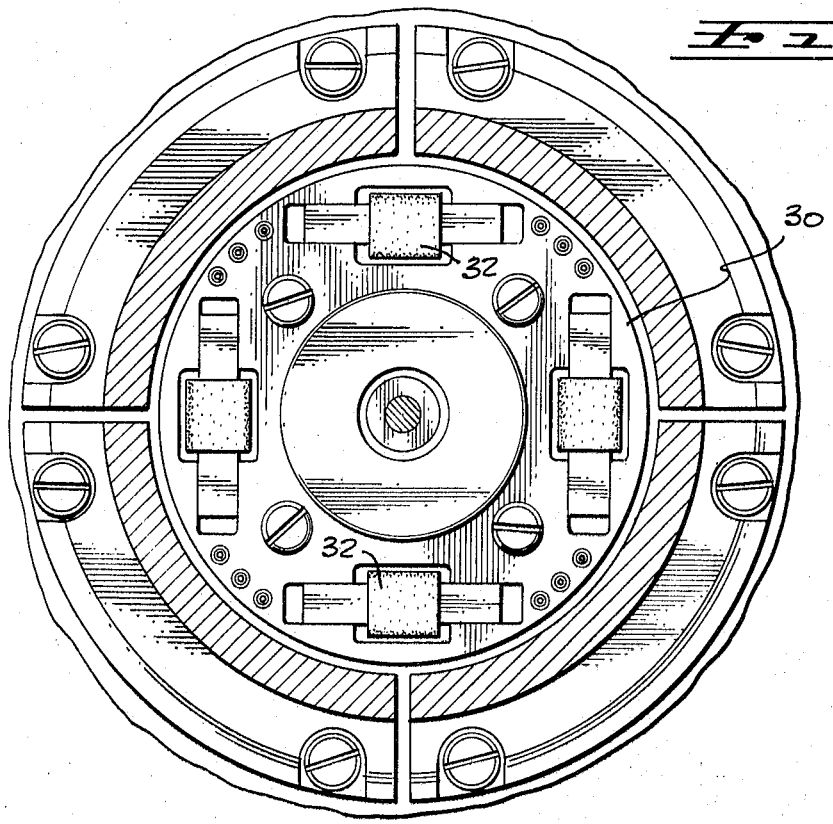
FIG. 3 is a section view of the gyro of FIG. 2 taken along the line 3—3 in the direction of the appended arrows.

Turning next to FIG. 3, there is shown the plate 30 which contains pick-off coils 32. The plate is mounted to the support structure of the gyroscope and provides the electrical signals which indicate the changes in attitude of the rotor 34 relative to the shaft 28 and the case 22, thereby enabling the gyro to function as an instrument.

Figure 4:
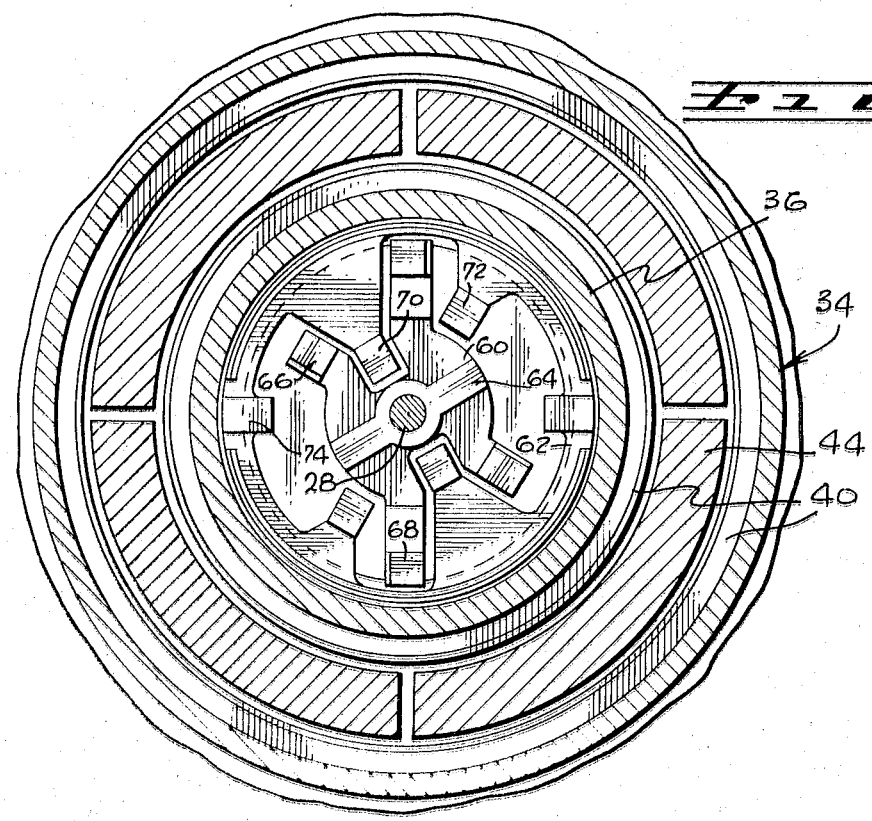
FIG. 4 is a section view of the gyro of FIG. 2 taken along the line 4—4 in the direction of the appended arrows.

In FIG. 4, there are shown two sets of mounting posts 60, 62, which respectively connect to the shaft 28 and the rotor 34. The first set of posts 60 includes an inner gimbal mounting pair 64, an intermediate gimbal mounting pair 66, and an outer gimbal mounting pair 68. The three mounting pairs are displaced roughly equiangularly so that each post is separated from the adjacent post by appproximately 60°.

Similarly, the second set of three mounting posts 62, associated with the rotor 34, includes an inner gimbal mounting pair 70, an intermediate gimbal mounting pair 72, and an outer gimbal mounting pair 74. Each of these pairs associated with the rotor 34 is orthogonal to the corresponding pair associated with the shaft.

Turning next to FIG. 5, there is shown, in an exploded view, the manner of coupling the shaft 28 to the rotor 34. A first or inner gimbal 80 is substantially a cylinder. On one end of the cylinder, four notches 82 or depressions forming mounting pads which are substantially complementary to the inner gimbal mounting pairs 64, 70 of the shaft and rotor, respectively.

At the opposite end of the cylinder, four relatively deep slots are provided circumferentially located intermediate the notches 82. A plurality of axially directed apertures 86 are provided in the cylinder wall within the gimbal 80 for purposes of balance so that minor mass asymmetries and twice spin frequency sensitivities can be compensated for.

An intermediate gimbal 90 is substantially similar to the inner gimbal 80 in that it provides a plurality or relatively shallow mounting notches 92 located orthogonal diameters on one end of the gimbal 90 and, at the opposite end, relatively deeper slots or channels 94. Further, a plurality of balancing apertures 96 are also provided.

An outer gimbal 100 is also substantially similar to the other gimbals. The outer gimbal 100 includes mounting notches 102 and, at the opposite end of the gimbal 100, relatively deeper, opposing slots which are offset from the mounting notches 102.

The mass of each of the gimbals is to be approximately the same. The dimensions of the relatively deep slots 84, 94 of the inner and intermediate gimbal, respectively, can be minimized, and the dimensions of the slots 104 of the outer gimbal can be maximized, so as to equalize the masses of the gimbals.

A plurality of flexural pivots 110, best seen in FIG. 6 and FIG. 7, below, are attached between a mounting post and the corresponding pad in the notch of the gimbal. In the embodiment shown, some twelve flexural pivots 110 are employed, each attaching the gimbal to the rotor and the shaft on several rotational axes. It will be understood that the mounting posts, when assembled, are all coplanar, as are the pads within the gimbal mounting notches.

Figure 6:
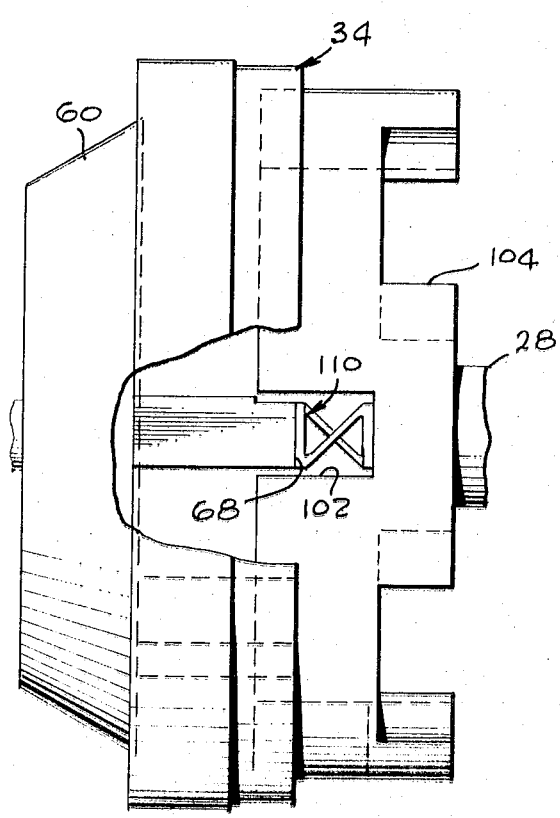
FIG. 6 is another section view showing the flexure bearing used to couple the gimbals to the rotor and shaft taken along the line 6—6 of FIG. 2 in the direction of the appended arrows.

Turning next to FIG. 6, there is shown in greater detail a preferred coupling element which joins one of the mounting posts 68 to the corresponding pad of the mounting slot 102 of the outer gimbal 100. As can be seen, a substantially X-shaped flexural pivot 110 is attached to the opposing surfaces.

Figure 7:
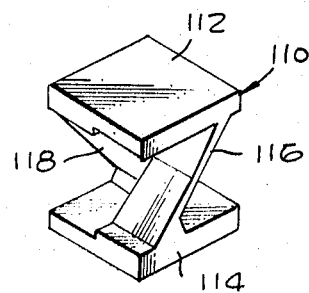
FIG. 7 is a perspective view of a flexure element.

In FIG. 7, the mounting flexure 110 is illustrated in greater detail. The flexure 110 includes an upper plate 112 and a lower plate 114. A first diagonal member 116 extends from the right-hand edge of the upper plate 112 to the left-hand edge of the lower plate 114. Similarly, a second diagonal 118 extends from the left-hand edge of the upper plate 112 to the right-hand edge of the lower plate 114.

As can be seen, the upper and lower plates 112, 114 are rigidly supported with respect to forces perpendicular to the parallel planes of the upper and lower plates 112, 114. Further, the combination also resists shear forces parallel to the planes of the upper and lower plates 112, 114. However, the upper and lower plates can rotate about an axis that goes through the crosspoint of the diagonals 116, 118 and in a plane parallel to the upper and lower plates 112, 114. The axis is also orthogonal to the diagonals 116, 118 and therefore accommodates a pivoting motion of the gimbal relative to a mounting post.

The pivots 110 are preferably made through an etching or milling process from a solid block of material. Other manufacturing techniques will be apparent to those skilled in the art.

Figure 8:
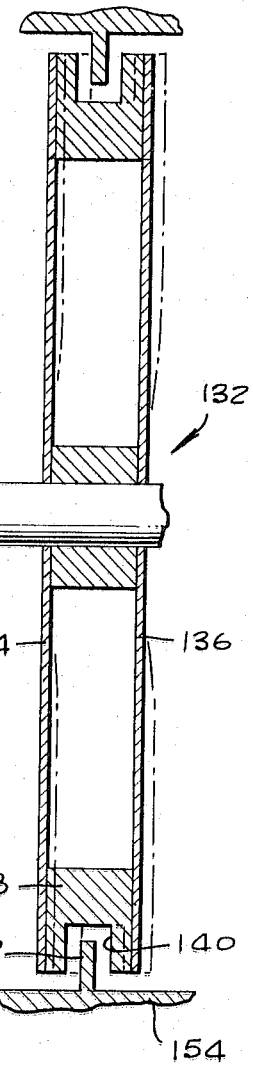
FIG. 8 is a simplified view of a limit-stop assembly.

Turning finally to FIG. 8, there is shown, in simplified but somewhat greater detail, the limit-stop assembly of the gyro of FIG. 2. In the present example, a shaft 130 is provided to which is mounted a limit-stop assembly 132 which includes a pair of diaphragms 134, 136 that are bonded the shaft 130.

A peripheral channel member 138 acts as a spacer for the diaphragms 134, 136 and further provides an exterior channel 140 within which a mating ridge or ring 152 can be positioned. The ridge 152 is attached to an inner periphery of a rotor member 154. The clearance of the ridge 152 within the channel 140 defines the amount of "tilt" permitted the rotor relative to the shaft 130.

So long as the movement of the rotor 154 relative to the shaft does not result in the ring engaging the edges of the channel 140, the gyro will continue to operate without problem. However, if the rotor "tilts" relative to the shaft 130 and the ring 152 on the left side, as seen in FIG. 8 and shown in dotted line, the opposite side of the rotor will be moved upwardly and the ring 152 will approach the top of the channel 140. Should contact then be made on the left side between the ring 152 and the channel 140, due to a change in attitude, the ring 158 will be subjected to a downward force as viewed in the figure.

The upper and lower diaphragms 134, 136 prevent a "tilting" of the diaphragms about the shaft 130. Any force applied to an edge of the diaphragms rather results in a deformation of the diaphragms in a direction perpendicular to the plane of the diaphragms and parallel to the shaft. This results in the same downward force being applied at the opposite side of the channel 140 to the upward moving ring 152 at the right side of the rotor, thereby applying a balancing "tilting" force to the rotor tending to restore the rotor to a rotational plane wherein the ring 152 remains wholly within the channel 140.

In operation, the improved limit stop of the gate need not be concerned with an asymmetry in the system whereby the downward moving ridge contacts the stop before the upward moving ridge contacts. With the disclosed structure, contact on either side immediately works a restoring force.

Each gimbal is responsible for the introduction of some twice frequency rectification error, and this error can be represented by a vector. With three gimbals, the three resultant vectors can be combined and resolved into opposing vectors that are orthogonal with respect to each other. If the moments of inertia are identical and the gimbals are exactly mounted on equiangular axes of rotation, the resultant vectors can be cancelled to zero merely by adjusting the inertia of each gimbal. It is no longer necessary to be concerned with the orthogonality of two gimbals.

Further, if for any reason the axes of rotation of the rotor relative to the gimbal or the gimbal relative to the shaft are not coplanar, a twice frequency rectification effect would be observed that can be simply eliminated by making the gimbals "pendulous." That is, it is merely necessary to change the plane of the center of mass of the individual gimbals to wholly compensate for any errors resulting from the centers of mass not being coplanar.

It will also appear to those skilled in the art that the specific combination illustrated with mounting pads on the shaft and rotor and corresponding apertures on the gimbals can easily be reversed so that the pads may be on the gimbals. Other combinations and variations are possible in which the post-aperture cooperation can be shared as between the gimbals.

What is claimed as new is:

1. In a tuned free rotor gyroscope having a rotor and a shaft for supplying rotational motion to the rotor, means coupling the rotor to the shaft comprising:
   a first gimbal member intermediate the shaft and rotor, said first gimbal having a pair of diametrically opposite points of attachment to the rotor and a pair of diametrically opposite points of attachment to the shaft;
   a second gimbal member intermediate the shaft and rotor, said second gimbal member having a pair of diametrically opposite points of attachment to the rotor and a pair of diametrically opposite points of attachment to the shaft, said second gimbal member attachment points being relatively displaced from said first gimbal member attachment points by more than 90°; and
   a third gimbal member intermediate the shaft and rotor, said third gimbal member having a pair of diametrically opposite points of attachment to the rotor and a pair of diametrically opposite points of attachment to the shaft, said third gimbal member attachment points being relatively displaced from said first and second gimbal member attachment points by more than 90°.

2. The coupling means of claim 1 wherein each point of attachment to the shaft of each of said gimbal members is displaced from the adjacent points of attachment to the rotor by 90°.

3. The coupling means of claim 1 wherein each of said gimbal members is a cylinder concentric and coaxial with the shaft and rotor.

4. The coupling means of claim 3 wherein the axes of rotation of the points of attachment are all coplanar.

5. The coupling means of claim 1 wherein each of said points of attachment include a post member, a pad portion, and a flexural member adapted to be fastened between said post and pad.

6. The coupling means of claim 5 wherein said post members are coupled to the rotor and to the shaft and said pad portions are located on said gimbal members.

7. The coupling means of claim 1 wherein the moments of inertia of all of the gimbals are equal when expressed $A_i + B_i - C_i$, wherein i represents the gimbal, and $A_i$, $B_i$ and $C_i$ are the principal moments of inertia of the associated gimbal with the principal axis associated with $C_i$ being substantially coincident with the spin axis of the shaft.

* * * * *